United States Patent
Komatsu

(10) Patent No.: US 10,882,138 B2
(45) Date of Patent: Jan. 5, 2021

(54) LASER CUTTING APPARATUS AND LASER CUTTING METHOD

(71) Applicant: MITSUBISHI HEAVY INDUSTRIES, LTD., Tokyo (JP)

(72) Inventor: Yoshinao Komatsu, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 156 days.

(21) Appl. No.: 16/135,146

(22) Filed: Sep. 19, 2018

(65) Prior Publication Data

US 2019/0091801 A1 Mar. 28, 2019

(30) Foreign Application Priority Data

Sep. 22, 2017 (JP) ................................. 2017-182319

(51) Int. Cl.
| | |
|---|---|
| B23K 26/16 | (2006.01) |
| B23K 26/38 | (2014.01) |
| B23K 26/14 | (2014.01) |
| B23K 26/142 | (2014.01) |

(52) U.S. Cl.
CPC .......... B23K 26/16 (2013.01); B23K 26/142 (2015.10); B23K 26/1436 (2015.10); B23K 26/38 (2013.01)

(58) Field of Classification Search
CPC ...... B23K 26/16; B23K 26/38; B23K 26/142; B23K 26/1436
See application file for complete search history.

(56) References Cited

U.S. PATENT DOCUMENTS

| | | | |
|---|---|---|---|
| 2010/0187209 A1* | 7/2010 | Miyazaki | B23K 26/38 219/121.84 |
| 2012/0195334 A1* | 8/2012 | Wilkiel | B23K 26/1476 372/26 |
| 2013/0122264 A1 | 5/2013 | Fujii et al. | |

FOREIGN PATENT DOCUMENTS

| | | |
|---|---|---|
| DE | 107 226 A1 | 7/1974 |
| DE | 10 2005 049 010 A1 | 4/2007 |
| JP | 63-76786 A | 4/1988 |
| JP | 2005-14075 A | 1/2005 |
| JP | 2011-041963 A | 3/2011 |
| JP | 2013-75818 A | 4/2013 |
| JP | 2015-178125 A | 10/2015 |
| JP | 2015127125 A * | 10/2015 |
| JP | 2016-215255 A | 12/2016 |
| JP | 2017-104891 A | 6/2017 |
| WO | WO 2013/005616 A1 | 1/2013 |

OTHER PUBLICATIONS

Machine translation of Japan Patent document No. 2015-178,125-A, Apr. 2020 (Year: 2020).*

* cited by examiner

*Primary Examiner* — Geoffrey S Evans
(74) *Attorney, Agent, or Firm* — Birch, Stewart, Kolasch & Birch, LLP

(57) ABSTRACT

A laser cutting apparatus includes a laser beam irradiation apparatus configured to radiate a laser beam, a pressure wave irradiation part including a plurality of pressure wave sources configured to radiate pressure waves toward a fusing part or a section to be cut by the laser beam, and a jet injection part configured to inject jets toward the fusing part or the section to be cut along respective outer circumferential sides of the pressure waves.

5 Claims, 4 Drawing Sheets

LASER CUTTING APPARATUS AND LASER CUTTING METHOD

BACKGROUND OF THE INVENTION

Field of the Invention

The present invention relates to a laser cutting apparatus and a laser cutting method.

Priority is claimed on Japanese Patent Application No. 2017-182319, filed Sep. 22, 2017, the content of which is incorporated herein by reference.

Description of Related Art

When a large-sized mechanical device is disassembled or a number of pieces of drilling work are performed, thermal processing using a laser cutting apparatus may be appropriately used. A laser cutting apparatus cuts and processes an object using thermal energy by a laser beam. Meanwhile, in order to perform accurate cutting, a means configured to remove melted parts (dross) generated due to the cutting is needed. In this regard, as a specific example of an apparatus capable of performing laser cutting while removing dross, an apparatus disclosed in Patent Document 1 is known. The apparatus disclosed in Patent Document 1 includes a laser beam irradiation apparatus, and a pressure wave irradiation apparatus having a plurality of ultrasonic sources configured to radiate pressure waves toward a fusing part. In Patent Document 1, the dross stuck to the fusing part can be removed by a shearing force of the pressure waves.

CITATION LIST

Patent Documents

[Patent Document 1] Japanese Unexamined Patent Application, First Publication No. 2015-178125

SUMMARY OF THE INVENTION

However, in the apparatus disclosed in Patent Document 1, since outer circumferential sections of the pressure waves supplied from the plurality of ultrasonic sources are exposed to outside air, a shearing force occurs between the pressure waves and the outside air. When the shearing force occurs, the pressure waves are attenuated. For this reason, the dross may be insufficiently removed while pressure waves having a desired strength are not able to be obtained.

In order to solve the above-mentioned problems, the present invention is directed to providing a laser cutting apparatus and a laser cutting method that are capable of efficiently removing dross.

According to a first aspect, a laser cutting apparatus includes a laser beam irradiation apparatus configured to radiate a laser beam; a pressure wave irradiation part including a plurality of pressure wave sources configured to radiate pressure waves toward a fusing part or a section to be cut by the laser beam; and a jet injection part configured to inject jets toward the fusing part or the section to be cut along respective outer circumferential sides of the pressure waves.

According to this configuration, a shearing force generated between the pressure waves and the outside air can be reduced by the jets injected from the jet injection part. Accordingly, a probability of the pressure waves being attenuated can be reduced. In particular, even when the fusing part or the section to be cut is disposed relatively far from the jet injection part, the pressure wave can reach the fusing part or the section to be cut while an intensity thereof is maintained. Accordingly, accurate cutting or fusing can be performed.

In addition, according to a second aspect, the jet injection part may inject the jets to surround respective circumferences of the pressure waves.

According to this configuration, since the jets are injected to surround respective circumferences of the pressure waves, generation of the shearing force between the pressure wave and the outside air can be reduced throughout the periphery of the pressure wave.

In addition, according to a third aspect, the jet injection part may have a plurality of nozzle parts having a circular shape when seen in a direction in which the jets are injected.

According to this configuration, since the nozzle part is formed in a circular shape, a uniform jet can be generated throughout a region in the circumferential direction while surrounding the pressure waves from the surroundings. Accordingly, generation of the shearing force generating between the pressure wave and the outside air can be reduced throughout the periphery of the pressure wave.

In addition, according to a fourth aspect, the jets may include an inert gas.

According to this configuration, an inert gas is used as the jet. In this case, since the jet blocks a fluid (air) in the surrounding space, probability of generating a chemical reaction (an oxidation reaction or the like) in the fusing part or the section to be cut can be reduced. Accordingly, the apparatus can be operated more safely.

In addition, according to a fifth aspect, a laser cutting method includes a process of injecting a jet toward a fusing part or a section to be cut along an outer circumferential side of a pressure wave while removing dross by radiating the pressure wave to the fusing part or the section to be cut, wherein the fusing part or the section to be cut generated by irradiating an object to be processed with a laser beam.

According to the method, the shearing force generated between the pressure wave and the outside air can be reduced by the jet injected along the outer circumferential side of the pressure wave. Accordingly, a probability of the pressure waves being attenuated can be reduced.

According to the present invention, it is possible to provide a laser cutting apparatus and a laser cutting method that are capable of efficiently removing dross.

DETAILED DESCRIPTION OF THE INVENTION

Figure 1:
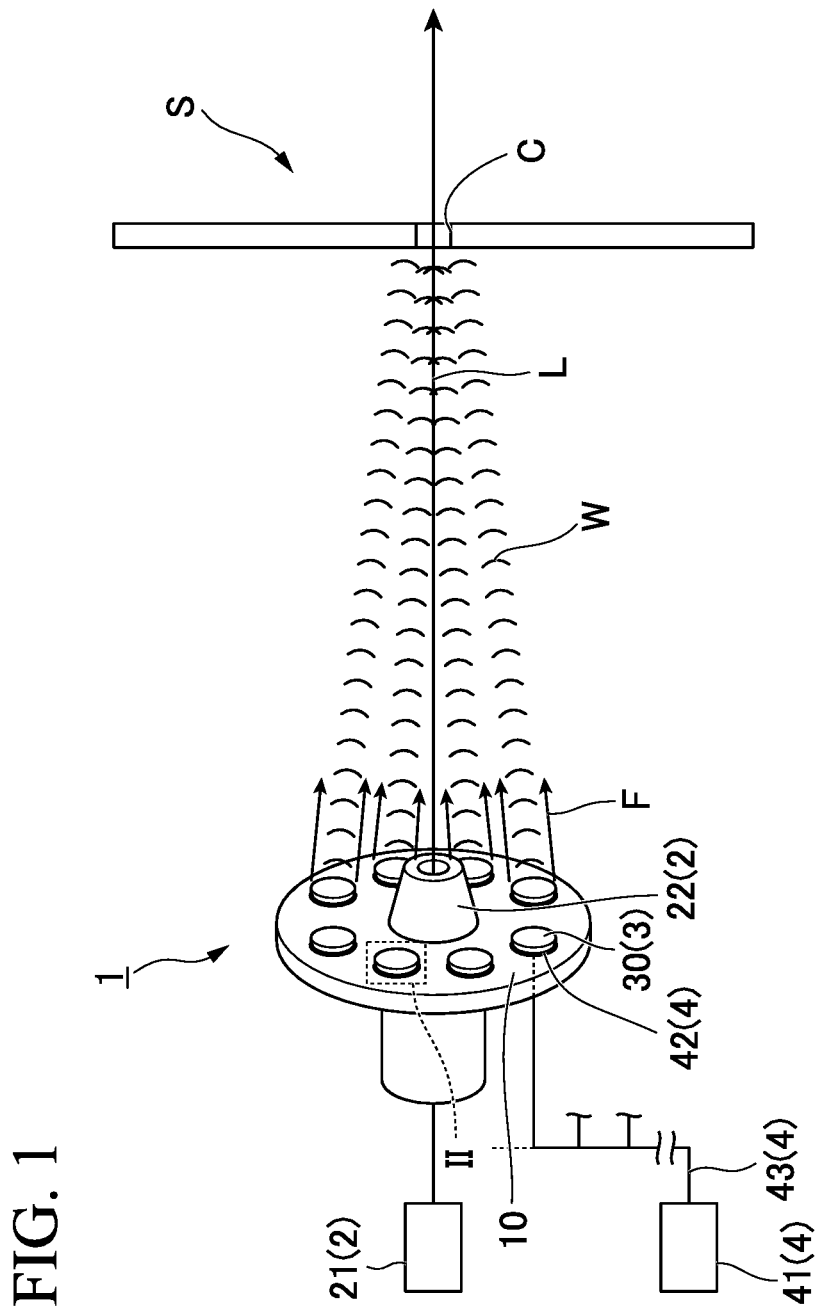
FIG. 1 is a view showing a configuration of a laser cutting apparatus according to an embodiment of the present invention.

An embodiment of the present invention will be described with reference to the accompanying drawings. As shown in FIG. 1, a laser cutting apparatus 1 according to the embodiment is an apparatus for fusing or cutting a subject S and performing drilling on the subject S using the energy of a laser beam L. The laser cutting apparatus 1 includes a laser beam irradiation apparatus 2, a pressure wave irradiation part 3 and a jet injection part 4.

The laser beam irradiation apparatus 2 has a laser oscillation apparatus 21 and a processing head 22. The laser oscillation apparatus 21 generates a laser beam L. The processing head 22 radiates the laser beam L generated by the laser oscillation apparatus 21 to a fusing part C or a section to be cut C of the subject S. The processing head 22 is disposed at a central position of a base plate 10 having a substantially circular shape.

The pressure wave irradiation part 3 generates a pressure wave W by oscillating air. The pressure wave W is applied to the fusing part C or the section to be cut C. When the pressure wave W is applied, dross D that is a melted part generated by laser cutting is blown away.

The pressure wave irradiation part 3 includes a plurality of pressure wave sources 30 arranged in a circumferential direction of the base plate 10 around the processing head 22. The pressure wave sources 30 radiate pressure waves W toward the fusing part C or the section to be cut C.

As shown in FIG. 1, in the embodiment, while the pressure wave irradiation part 3 includes eight pressure wave sources 30 arranged in a circumferential direction of the base plate 10, a configuration may have any number or arrangement of pressure wave sources 30.

Each of the pressure wave sources 30 has a plurality of pressure wave oscillators 31 arranged in an array shape.

Figure 2:
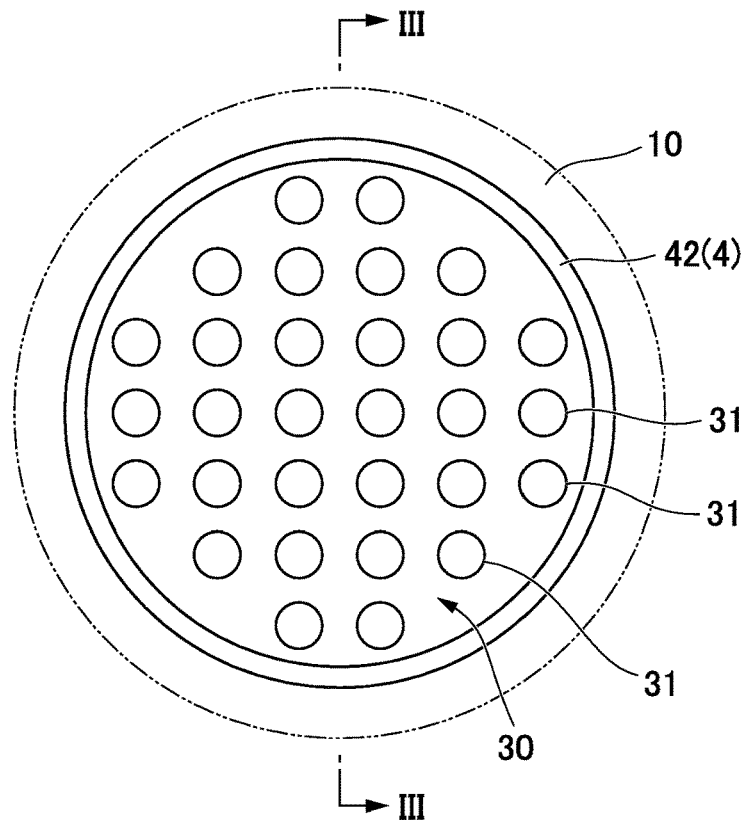
FIG. 2 is an enlarged view of a portion II of FIG. 1 when seen in a radiation direction of a laser beam.

In the embodiment, the pressure wave W is an ultrasonic wave. For example, ultrasonic oscillators are appropriately used as the pressure wave oscillators 31. As shown in FIG. 2, the plurality of pressure wave oscillators 31 in each of the pressure wave sources 30 are arranged on the base plate 10 at intervals such that an appearance thereof takes the form of an annular shape while having a lattice shape arrangement.

The pressure waves W are radiated from the plurality of pressure wave sources 30 toward the fusing part C or the section to be cut C in a state in which oscillations thereof are synchronized with each other.

In the embodiment, the plurality of pressure wave sources 30 are disposed such that the pressure waves W are focused at the fusing part C or the section to be cut C and a directivity is enhanced.

The focused pressure waves W have an energy that blows away the dross D occurring on the fusing part C or the section to be cut C.

The jet injection part 4 protects the pressure waves W from outside air by covering the periphery of respective the pressure waves W using gas jets F. The jet injection part 4 has a tank 41 configured to store a gas, a plurality of nozzle parts 42 formed on the base plate 10, and a supply pipe 43 configured to connect the tank 41 to respective the nozzle parts 42.

One end of the supply pipe 43 is connected to the tank 41. The other end of the supply pipe 43 branches off into a plurality of parts, each of which is connected to the respective nozzle part 42. Accordingly, the gas stored in the tank 41 is supplied to the nozzle parts 42 via the supply pipe 43.

Figure 3:
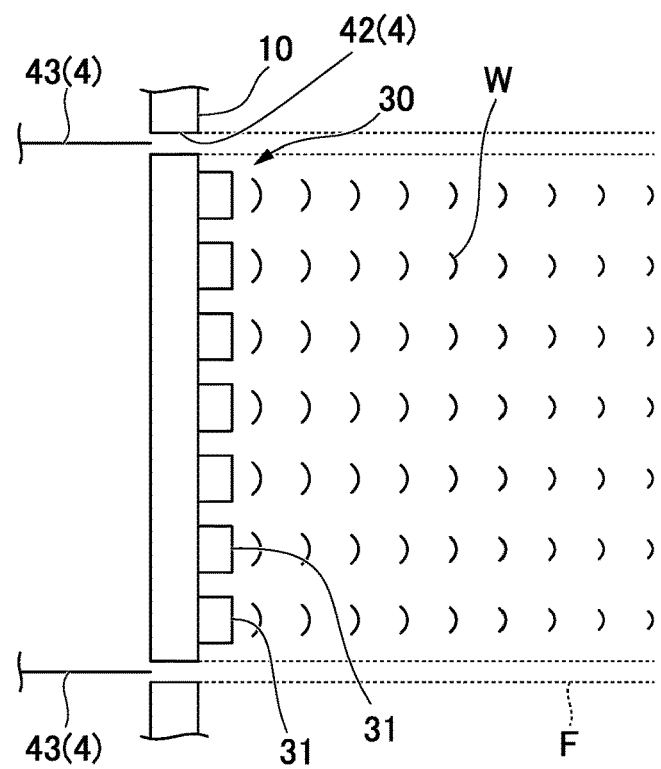
FIG. 3 is a cross-sectional view taken along line III-III of FIG. 2.

As shown in FIG. 3, the jet injection part 4 injects the jets F toward the fusing part C or the section to be cut C along respective outer circumferential sides of the pressure waves W.

In addition to air, an inert gas such as nitrogen, argon, or the like, may be used as a gas of the jets F.

In the embodiment, the nozzle parts 42 are formed on the base plate 10. Each of the nozzle parts 42 is an opening section having an opening passing through the base plate 10 from the supply pipe 43 side toward the fusing part C or the section to be cut C. Each of nozzle parts 42 is installed in the respective pressure wave source 30. Each of the nozzle parts 42 opens in a circular slit shape to surround the respective pressure wave source 30 from an outer circumferential side. A gas pumped from the tank 41 becomes the jets F that are directed toward the fusing part C or the section to be cut C when passed through the nozzle parts 42. At this time, each of the jets F flows to surround the respective pressure wave W radiated from the pressure wave source 30 from the outer circumferential side thereof.

According to the above-mentioned configuration, the laser cutting apparatus 1 performs a laser cutting method including a process of injecting a jet F toward the fusing part C or the section to be cut C along an outer circumferential side of a pressure wave W while radiating the pressure wave W to the fusing part C or the section to be cut C occurred by irradiating the subject S with the laser beam L.

When the subject S is irradiated with the laser beam L, the fusing part C or the section to be cut C is generated on the subject S. Here, dross obtained by melting the subject S also occurs on the fusing part C or the section to be cut C. When the pressure waves W are radiated from the respective pressure wave sources 30, the dross is removed by the pressure waves W. Here, when the pressure wave W is directly exposed to the outside air, a shearing force is generated between the pressure wave W and the outside air. When the shearing force is generated, the pressure wave W of the outermost circumferential section is attenuated. Here, in the embodiment, the jets F are injected along the outer circumferential side of the respective pressure waves W. A shearing force generated between the pressure wave W and the outside air is reduced by the jet F.

Hereinabove, as described above, according to the above-mentioned configuration, the shearing force generated between the pressure wave W and the outside air can be reduced by the jet F injected from the jet injection part 4. Accordingly, a probability of the pressure waves being attenuated W can be decreased.

In particular, even when the fusing part C or the section to be cut C is disposed relatively far from the jet injection part, the pressure wave W can reach the fusing part C or the section to be cut C while an intensity thereof is maintained. Accordingly, accurate cutting or fusing can be performed.

Figure 4:
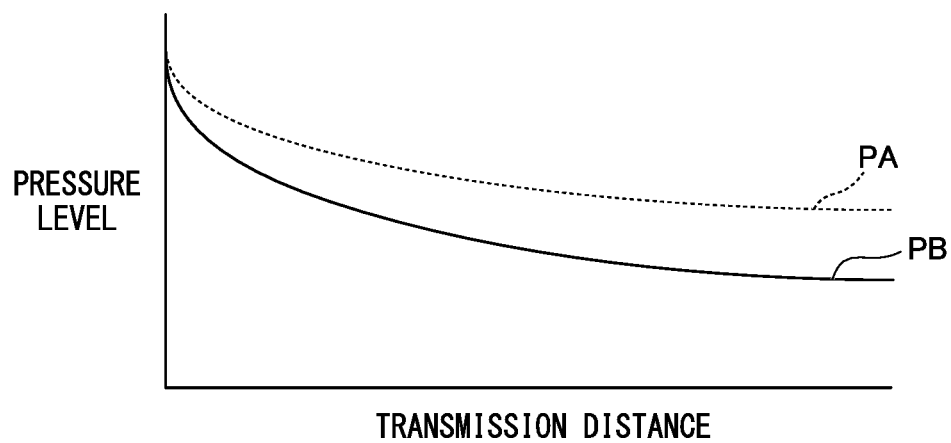
FIG. 4 is a graph showing a pressure level with respect to a transmission distance.

FIG. 4 shows an attenuation characteristics curve PA of the pressure wave W when the jet F is injected and an attenuation characteristics curve PB of the pressure wave W when the jet F is not injected. As shown in FIG. 4, an attenuation of the pressure wave W with respect to a transmission distance can be minimized when the jet F is injected as in the embodiment in comparison with the case in which the jet F is not injected.

In this way, the laser cutting apparatus 1 of the embodiment can maintain a pressure level (pressure intensity) of the pressure wave W over a relatively long distance.

Further, according to the above-mentioned configuration, since the jets F are injected to surround the respective circumferences of pressure waves W, generation of the shearing force between the pressure wave W and the outside air can be reduced throughout the surroundings of the pressure wave W.

In addition, according to the above-mentioned configuration, since the nozzle parts 42 are formed in a circular shape, uniform jets F can be generated throughout the region in the circumferential direction while surrounding the respective pressure waves W from the surroundings. Accordingly, generation of a shearing force between the pressure wave W and the outside air can be decreased throughout the surroundings of the pressure wave W.

In addition, according to the above-mentioned configuration, an inert gas is used as a gas that forms the jet F. Accordingly, even when heat remaining on the fusing part C or the section to be cut C is propagated to the jet F, probability of generating an unprepared chemical reaction in the jet F can be decreased. Accordingly, the apparatus can be more safely operated.

Hereinabove, the embodiment of the present invention has been described with reference to the drawings. Further, various modifications or improvements may be made to the above-mentioned configuration without departing from the spirit of the present invention.

For example, in the embodiment, an example in which the pressure wave oscillators 31 are arranged in a lattice shape and an annular shape has been described. However, the disposition of the pressure wave oscillators 31 is not limited to that in the embodiment and may be a rectangular shape or a polygonal shape as a whole.

In addition, the pressure wave oscillator 31 is not limited to an ultrasonic oscillator, and a device for generating sonic waves in an audible range may be used as the pressure wave oscillator. In this case, sonic waves in an audible range may be used as the pressure wave W.

In addition, while the jet F surrounds the circumference of the pressure wave W in the embodiment, the jet F may completely or partially surround the circumference of the pressure wave W. As a variant, the jet F may be formed on a portion of the surroundings of the pressure wave W if generation of the shearing force is decreased.

Figure 5:
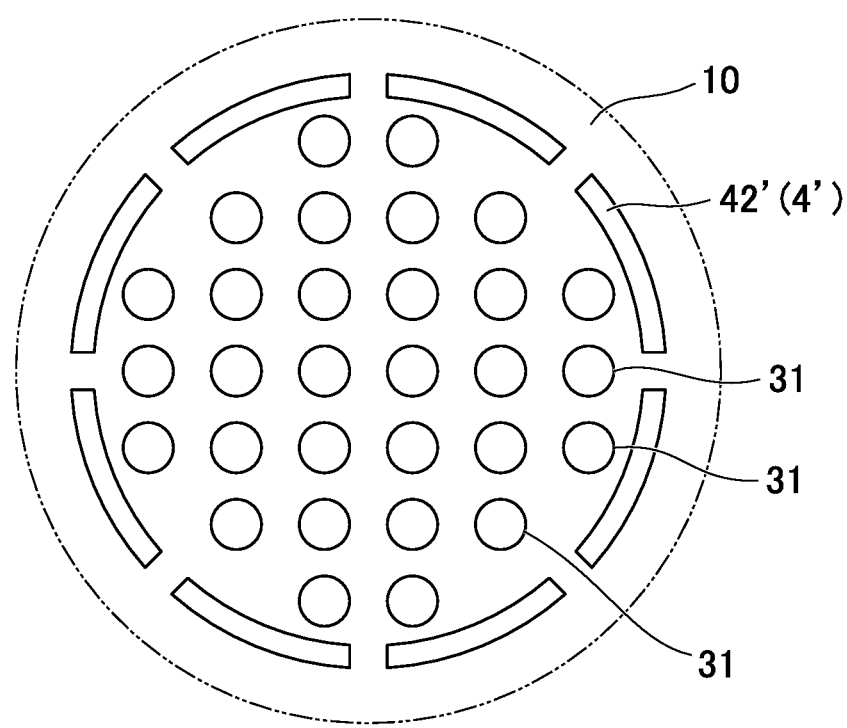
FIG. 5 is an enlarged view of a variant of the laser cutting apparatus according to the embodiment of the present invention when seen in a radiation direction of a laser beam.
Figure 6:
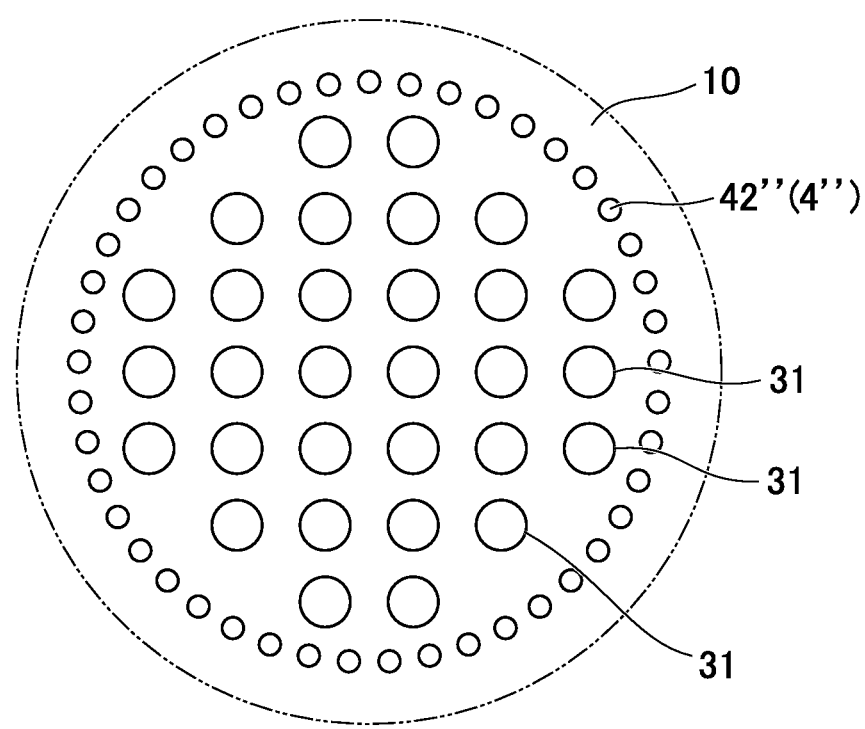
FIG. 6 is an enlarged view of another variant of the laser cutting apparatus according to the embodiment of the present invention when seen in a radiation direction of a laser beam.

In addition, in the embodiment, the nozzle parts 42 have a circular slit-shaped opening to surround the respective pressure wave sources 30 from the outer circumferential side. As a variant, like nozzle parts 42' of a jet injection part 4' shown in FIG. 5, the nozzle parts may have a plurality of arc slit-shaped openings arranged along a circumference of the respective pressure wave sources 30 to surround the respective pressure wave sources 30 from the outer circumferential side. As another variant, like nozzle parts 42" of a jet injection part 4" shown in FIG. 6, the nozzle parts may have a plurality of holes arranged along surroundings of the respective pressure wave sources 30 to surround the pressure wave source 30 from the outer circumferential side. In this case, the shape of the holes may be a circular shape or a polygonal shape.

In addition, in the embodiment, the nozzle parts 42 are formed on the base plate 10. As a variant, the nozzle parts may be provided between the base plate 10 and the fusing part C or the section to be cut C separately from the base plate 10.

INDUSTRIAL APPLICABILITY

According to the present invention, it is possible to provide a laser cutting apparatus and a laser cutting method that are capable of efficiently removing dross.

EXPLANATION OF REFERENCES

1 Laser cutting apparatus
2 Laser beam irradiation apparatus
3 Pressure wave irradiation part
4 Jet injection part
4' Jet injection part
4" Jet injection part
10 Base plate
21 Laser oscillation apparatus
22 Processing head
30 Pressure wave source
31 Pressure wave oscillator
41 Tank
42 Nozzle part
42' Nozzle part
42" Nozzle part
43 Supply pipe
C Fusing part, or section to be cut
F Jet
S Object
L Laser beam
W Pressure wave

What is claimed is:

1. A laser cutting apparatus comprising:
a laser beam irradiation apparatus configured to radiate a laser beam;
a pressure wave irradiation part including a plurality of pressure wave sources configured to radiate pressure waves toward a fusing part or a section to be cut by the laser beam; and
a jet injection part configured to inject jets along respective outer circumferential sides of the pressure waves toward the fusing part or the section to be cut.

2. The laser cutting apparatus according to claim 1, wherein the jet injection part injects the jets to surround respective circumferences of the pressure waves.

3. The laser cutting apparatus according to claim 1; wherein the jet injection part has a plurality of nozzle parts having a circular shape when seen in a direction in which the jets are injected.

4. The laser cutting apparatus according to claim 1, wherein the jets include an inert gas.

5. A laser cutting method comprising:
a process of injecting a jet along an outer circumferential side of a pressure wave toward a fusing part or a section to be cut while removing dross by radiating the pressure wave to the fusing part or the section to be cut, wherein the fusing part or the section to be cut generated by irradiating an object to be processed with a laser beam.

* * * * *